United States Patent [19]

Brownlow et al.

[11] 3,928,051
[45] Dec. 23, 1975

[54] DIELECTRIC GLASSES

[75] Inventors: James M. Brownlow, Crompond; Relva C. Buchanan, Fishkill; Rao R. Tummala, Wappingers Falls, all of N.Y.

[73] Assignee: International Business Machines Corporation, Armonk, N.Y.

[22] Filed: Dec. 6, 1973

[21] Appl. No.: 422,378

[52] U.S. Cl. ................................. 106/53; 106/49
[51] Int. Cl.² .... C03C 3/10; C03C 3/04; C03C 5/02
[58] Field of Search .................. 106/53, 49; 252/518

[56] References Cited
UNITED STATES PATENTS 3,238,151  3/1966  Kim .................................. 106/53

Primary Examiner—Winston A. Douglas
Assistant Examiner—Mark Bell
Attorney, Agent, or Firm—Edward S. Gershuny

[57] ABSTRACT

A family of dielectric glasses having properties such that, when heat is applied to seal the dielectric glasses, there is no crazing in a MgO overcoat. These dielectric glasses have such viscosity properties as not to craze a MgO overcoat at a temperature of about 480°C corresponding approximately to log viscosity of 10.3 poises and yet fire into good dielectric films at about 610°C. The glass has substantially the following constituents:

|  | % by weight |
|---|---|
| PbO | 55.0–57.0 |
| $SiO_2$ | 12.0–14.0 |
| $B_2O_3$ | 21.0–22.0 |
| $Al_2O_3$ | 1.0–4.0 |
| MgO | 1.5–2.2 |
| CaO | 2.0–5.5 |
| $Na_2O$ | 1.8–2.2 |

5 Claims, No Drawings

DIEELECTRIC GLASSES

BACKGROUND OF THE INVENTION

This invention relates to a composition of dielectric glasses. More particularly, the invention relates to novel glasses which are particularly suited for use in the manufacture of gas panel displays.

Plates used in manufacturing a gas display panel contain a dielectric layer with a magnesium oxide overcoat. In the prior art, during the step of sealing plates together, the magnesium oxide overcoat layer has a tendency to craze (develop small cracks). This is, of course, undesirable as the underlying dielectric is then exposed to gas plasma.

It is a primary object of this invention to provide a dielectric glass having such properties that the crazing temperature will be higher than the temperature used for sealing panels together and that substantially flat, warp-free panels can be produced.

Additional objects of the invention are to provide a dielectric glass having the following properties:

- a steep viscosity-temperature curve such that the dielectric is capable of being fired at a temperature below the incipient fusion temperature of the glass substrate;
- a thermal co-efficient of expansion (TCE) which matches that of the substrate;
- capable of being flowed easily into bubble free films with little or no tendency to crystallize; and
- good chemical durability.

SUMMARY OF THE INVENTION

The above and other objects are achieved in accordance with the invention by providing a dielectric glass composed substantially of the following constituents:

| | % by weight |
|---|---|
| PbO | 55.5–57.0 |
| $SiO_2$ | 12.0–14.0 |
| $B_2O_3$ | 21.0–22.0 |
| $Al_2O_3$ | 1.0–4.0 |
| MgO | 1.5–2.2 |
| CaO | 2.0–5.5 |
| $Na_2O$ | 1.8–2.2 |

When the dielectric glass of this invention is used in the process of manufacturing a gas display panel, the glass substrate upon which it is deposited is typically a sodalime-silica float glass having a thermal co-efficient of expansion (TCE) of approximately $94 \times 10^{-7}$ per °C to the set point of the dielectric (approximately 430°C). Therefore, the dielectric glass should preferably have a TCE of approximately 90–98 to its set point. This corresponds to a TCE of approximately 78–86 in the temperature range from room temperature (approximately 22°C) to 300°C. Glasses which are particularly suitable for use in this process consist of substantially the following constituents:

| | % by weight |
|---|---|
| PbO | 56.0–56.7 |
| $SiO_2$ | 12.0–12.5 |
| $B_2O_3$ | 21.0–21.5 |
| $Al_2O_3$ | 1.0–2.8 |
| MgO | 2.0 |
| CaO | 3.5–5.5 |
| $Na_2O$ | 2.0 |

The primary advantage of this invention is that, when using the dielectric glasses described herein a magnesium oxide overcoat layer will not craze unless it is subjected to a relatively high temperature. This is of particular advantage in vitreous sealing technology using glass rod preforms. Referring particularly to glasses whose constituents are within the preferred ranges described above, the crazing temperature (480°C and above) is higher than the temperature normally used to seal glass plates together (around 470°–480°C) using vitreous sealing glasses during the process of manufacturing a gas display panel.

Additionally, each of the glasses described herein also exhibits one or more of the following desirable properties:

- it can be fired below the incipient fusion temperature of the substrate;
- its TCE is fairly close to that of the substrate;
- it flows easily into a smooth bubble free film with little or no tendency to crystallize; and
- it has good chemical durability.

The foregoing and other objects, features and advantages of the invention will be apparent from the following more particular description of preferred embodiments thereof.

DETAILED DESCRIPTION

All of the glasses described herein contain constituents within the ranges shown in the following table. In all of the examples shown below, the glasses contain 2 per cent sodium oxide and (except for Example VI) 2 per cent magnesium oxide. However, each of these constituents can be varied to a limited extent while still preserving the desirable properties described herein. The preferred range is 1.8–2.2 per cent for each of the oxides of sodium and magnesium. Although glasses of higher MgO content have the desirable property of giving higher crazing temperatures, glasses with more than about 3 per cent MgO tend to show fine crystals in the fired dielectric. Glasses with higher CaO contennt (above about 5.5 per cent) also give higher crazing temperatures but they tend to have higher TCEs.

| | % by weight |
|---|---|
| PbO | 55.5–56.7 |
| $SiO_2$ | 12.0–13.5 |
| $B_2O_3$ | 21.0–21.5 |
| $Al_2O_3$ | 1.0–4.0 |
| MgO | 1.5–2.2 |
| CaO | 2.0–5.5 |
| $Na_2O$ | 1.8–2.2 |

EXAMPLES I–IV

Examples I–IV are four dielectric glass compositions which are particularly suitable for use in fabricating gas display panels, especially when using a glass substrate which has a TCE equal to 89. (When thermal co-efficients of expansion are given herein, they are expressed in units multiplied by $10^{-7}/°C$ and refer to the temperature range from room temperature to 300°C.)

Percent By Weight

| | I | II | III | IV |
|---|---|---|---|---|
| PbO | 56.0 | 56.7 | 56.0 | 56.0 |
| $SiO_2$ | 12.0 | 12.0 | 12.5 | 12.5 |
| $B_2O_3$ | 21.5 | 21.0 | 21.5 | 21.5 |
| $Al_2O_3$ | 1.0 | 2.8 | 2.0 | 1.0 |
| MgO | 2.0 | 2.0 | 2.0 | 2.0 |

Percent By Weight-continued

|     | I | II | III | IV |
|-----|-----|-----|-----|-----|
| CaO | 5.5 | 3.5 | 4.0 | 5.0 |
| Na$_2$O | 2.0 | 2.0 | 2.0 | 2.0 |
| TCE(RT-300) | 86 | 84 | 83.9 | 85 |
| TCraze | above 480 | about 480 | above 480 | about 480 |

It will be noted that the glass compositions of examples I–IV all exhibit a TCE which is quite compatible to that of the glass substrate. It is also of great importance that, when using these glasses, the temperature at which crazing will occur in the magnesium oxide overcoat is above 480°C. This is far enough above the temperatures normally used today in sealing glass panels together (about 440°–480°C) so that no significant crazing will occur during the manufacturing process.

The four preferred glasses all contain constituents within the following ranges.

|     | % by weight |
|-----|-----|
| PbO | 56.0–56.7 |
| SiO$_2$ | 12.0–12.5 |
| B$_2$O$_3$ | 21.0–21.5 |
| Al$_2$O$_3$ | 1.0–2.8 |
| MgO | 1.8–2.2 |
| CaO | 3.5–5.5 |
| Na$_2$O | 1.8–2.2 |

EXAMPLES V–VIII

Examples V–VIII are four additional dielectric glasses which offer various advantages.

Percent By Weight

|     | V | VI | VII | VIII |
|-----|-----|-----|-----|-----|
| PbO | 56.0 | 55.0 | 55.5 | 57.0 |
| SiO$_2$ | 13.0 | 12.5 | 13.5 | 14.0 |
| B$_2$O$_3$ | 21.0 | 21.0 | 21.0 | 22.0 |
| Al$_2$O$_3$ | 3.0 | 4.0 | 2.0 | 1.0 |
| MgO | 2.0 | 1.5 | 2.0 | 2.0 |
| CaO | 3.0 | 4.0 | 4.0 | 2.0 |
| Na$_2$O | 2.0 | 2.0 | 2.0 | 2.0 |
| TCE(RT-300) | 80 | 80.9 | 78 | 82 |

The glasses of examples V–VIII are somewhat less desirable than examples I–IV for use in the preferred process of manufacturing gas panel displays primarily because they have lower B$_2$O$_3$/SiO$_2$ ratios and are therefore harder to make bubble-free. However, examples V–VIII could be of substantial value in processes where they can be fired at slightly higher temperatures. Examples I–VIII comprise a class of dielectric glasses constituted substantially as follows.

|     | % by weight |
|-----|-----|
| PbO | 55.0–57.0 |
| SiO$_2$ | 12.0–14.0 |
| B$_2$O$_3$ | 21.0–22.0 |
| Al$_2$O$_3$ | 1.0–4.0 |
| MgO | 1.5–2.2 |
| CaO | 2.0–5.5 |
| Na$_2$ 1.8–2.2 | |

ADDITIONAL CONSIDERATIONS

Although glasses which have a high SiO$_2$ content (for example, 15 per cent or more) have higher crazing temperatures, they cannot be conveniently flowed into smooth bubble free dielectric films due to their shallow viscosity-temperature relationship. For a given crazing temperature, a glass with a higher B$_2$O$_3$ content than SiO$_2$ can be flowed more easily in oxidizing atmospheres (in all of the examples given above the B$_2$O$_3$ content is higher than the SiO$_2$ content). However, prior art glasses that are high in B$_2$O$_3$ content typically have low crazing temperatures and low chemical durabilities.

As is described in copending application Ser. No. 374,189 filed June 27, 1973, the MgO-crazing temperature in high B$_2$O$_3$ glasses can be increased by incorporating MgO, CaO or (preferably) both into the glass composition. These glasses can be fired into smooth bubble free films because they have a steep viscosity-temperature relationship.

An essential element of the glasses described herein is the inclusion of Na$_2$O, preferably in concentrations between approximately 1.8 annd 2.2 percent, in order to minimize detrimental leaching of sodium from alkali containing substrates during reflow of the dielectric glass. Such leaching could cause substrate deformation.

It should also be noted that these glasses respond to wet air and wet oxygen firing resulting in the use of lower firing temperatures for the same crazing temperature. For example, both Glass I described herein and a glass consisting of 71.5 per cent PbO, 6 per cent B$_2$O$_3$, 17 per cent SiO$_2$ and 5.5 per cent alumina would have approximately the same MgO crazing temperature, the latter cannot be fired bubble-free below about 660°C, which is too high for the substrate. It is important that the glasses can be fired in a wet atmosphere as this causes in situ passivation of the Cr/Cu/Cr metallurgy.

While the invention has been particularly shwon and described with reference to preferred embodiments thereof, it will be understood by those skilled in the art that the above and other changes in form and details may be made therein without departing from the spirit and scope of the invention.

What is claimed is:

1. A dielectric glass having a thermal coefficient of expansion (from room temperature to 300°C) in the range of approximately 83.9–86.0 × 10$^{-7}$ per °C and a crazing temperature with respect to a magnesium oxide overcoat above about 480°C, consisting essentially of the following ingredients in the following proportions:

|     | Percent by weight |
|-----|-----|
| Lead oxide (PbO) | 56.0–56.7 |
| Boric oxide (B$_2$O$_3$) | 21.0–21.5 |
| Silicon oxide (SiO$_2$) | 12.0–12.5 |
| Alumina (Al$_2$O$_3$) | 1.0–2.8 |
| Calcium oxide (CaO) | 3.5–5.5 |
| Magnesium oxide (MgO) | 2.0 |
| Sodium oxide (Na$_2$O) | 2.0. |

2. A dielectric glass in accordance with claim 1 consisting essentially of:

56.0 percent PbO, 21.5 percent B$_2$O$_3$, 12.0 percent SiO$_2$, 1.0 percent Al$_2$O$_3$, 5.5 percent CaO, 2.0 percent MgO and 2.0 percent Na$_2$O.

3. A dielectric glass in accordance with claim 1 consisting essentially of:

56.7 percent PbO, 21.0 percent B$_2$O$_3$, 12.0 percent SiO$_2$, 2.8 percent Al$_2$O$_3$, 3.5 percent CaO, 2.0 percent MgO and 2.0 percent Na$_2$O.

4. A dielectric glass in accordance with claim 1 consisting essentially of:

56.0 percent PbO, 21.5 percent $B_2O_3$, 12.5 percent $SiO_2$, 2.0 percent $Al_2O_3$, 4.0 percent CaO, 2.0 percent Mgo and 2.0 percent $Na_2O$.

5. A dielectric glass in accordance with claim 1 consisting essentially of:

56.0 percent PbO, 21.5 percent $B_2O_3$, 12.5 percent $SiO_2$, 1.0 percent $Al_2O_3$, 5.0 percent CaO, 2.0 percent MgO and 2.0 percent $Na_2O$.

* * * * *